Sept. 30, 1969        F. D. BARBER        3,469,537
TORSION DAMPENED RAILWAY TRUCK SPRING BOLSTER
Filed Nov. 1, 1967
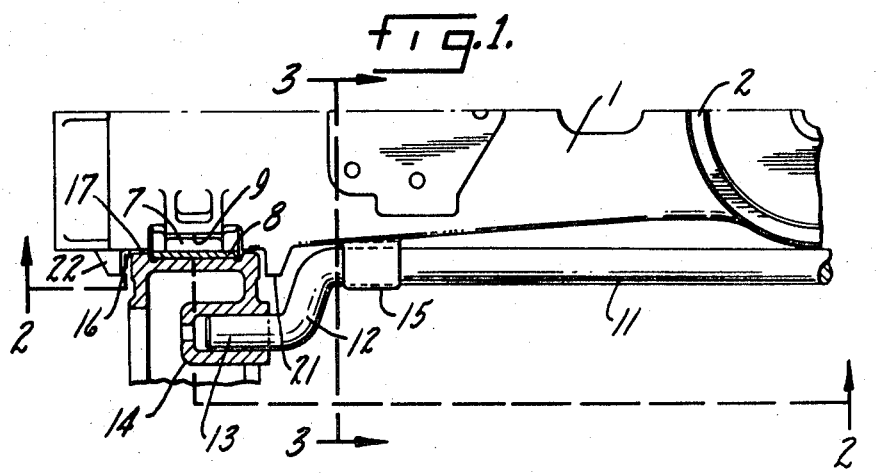
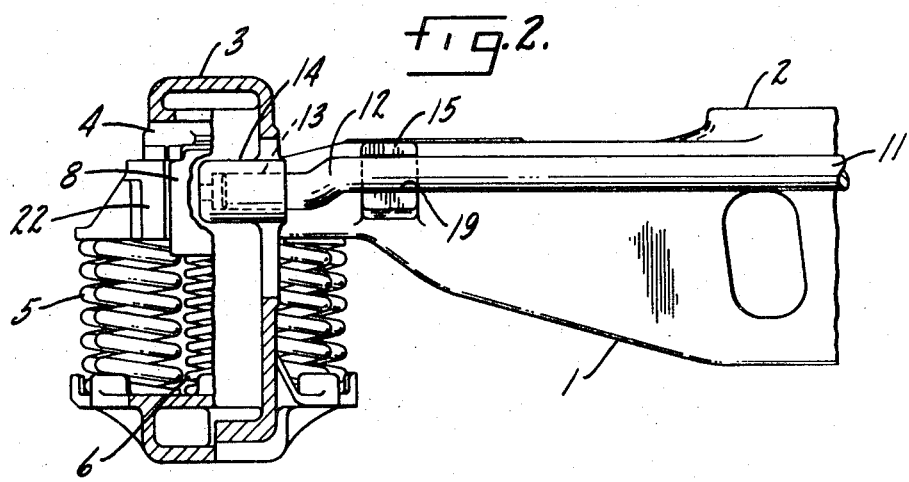
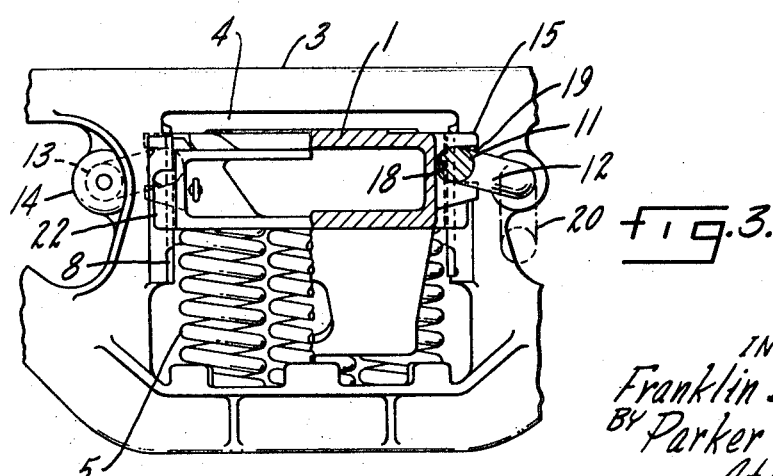
INVENTOR.
Franklin D. Barber,
BY Parker & Carter
Attorneys.

United States Patent Office 3,469,537
Patented Sept. 30, 1969

3,469,537
TORSION DAMPENED RAILWAY TRUCK SPRING BOLSTER
Franklin D. Barber, Flossmoor, Ill., assignor to Standard Car Truck Company, Chicago, Ill., a corporation of New Jersey
Continuation-in-part of application Ser. No. 608,893, Jan. 12, 1967, which is a continuation-in-part of application Ser. No. 580,027, Sept. 16, 1966. This application Nov. 1, 1967, Ser. No. 679,715
Int. Cl. B61f 5/30; F16f 1/06
U.S. Cl. 105—197                                1 Claim

ABSTRACT OF THE DISCLOSURE

In a railroad car truck including windowed side frames and a spring supported bolster, means for constraining both ends of the bolster to parallel uniform up and down motion in the window which includes a torsion bar extending across the truck parallel with the bolster, crank arms at the ends thereof terminating in crank pins rotatable in bearings on the side frames, lugs projecting outwardly from the side of the bolster horizontally slotted to slidably and rotatably receive the torsion bar adjacent the cranks at each end thereof, the relationship being such that when the bolster is lowered in the window beyond the usual spring supported position, the torsion bar rotates out of the lugs and out of contact with the bolster to hang freely clear of the bolster.

---

This application is a continuation-in-part of applicant's copending application Ser. No. 608,893, filed Jan. 12, 1967, now abandoned, which is a continuation-in-part of applicant's application Ser. No. 580,027, filed Sept. 16, 1966, now abandoned, and the invention is illustrated as No. 608,893 filed Jan. 12, 1967 and is illustrated as applied to a conventional type of stabilized railroad car truck such as disclosed in Patent No. 3,127,850 to C. J. W. Clasen, issued Apr. 7, 1964.

Summary of the invention

The object of this invention is to provide in a railroad car, means for equalizing the up and down motion of the opposite ends of a car truck bolster which supports the car body with the result of minimizing rocking of the car as it travels along the track.

Another object is to provide means whereby standard, conventional railway car trucks may be easily and conveniently modified in the field to accomplish the desired result, thus obviating the necessity of calling cars back to the car shop and rebuilding them. The mechanism disclosed in this invention may be used in a car truck and bolster built for the express purpose of using this invention but it is equally useful in the modification of standard railway car trucks with great savings in expense and complication.

This invention contemplates welding or otherwise mounting on the side frames of a car truck, bearing bosses which will receive crank pins in crank arms extending from the ends of a torsion rod which extends across the truck. The torsion rod being held adjacent each end of the truck bolster in bosses welded or otherwise attached to the bolster which are horizontally slotted and open away from the bolster to receive the torsion rod.

When one end of the spring supported bolster moves downwardly, the crank twists the torsion rod to force the crank at the other end downwardly in the same direction so that both ends of the bolster are urged up and down in the same direction at the same time.

Since the bearing bosses and the slotted bosses may be built into the frame and bolster or may be separately mounted therein, it is easy to fit the bosses and the torsion bar to an old truck in the field.

The distance between the centers of rotation of the crank pins and the torsion rod is such that under ordinary circumstances with the bolster spring supported, they are always in working relationship. There is thus a positive control of both ends of the bolster. When the springs are removed and the bolster allowed to drop, then as the cranks rotate the torsion bar rotates out of the open notches in the bosses and hangs freely, being supported only by the side frames, altogether out of contact with the bolster, thus making it easy to assemble and disassemble the bolster, the balancing means and the truck.

Brief description of the drawings

Referring to the drawings:
FIGURE 1 is a detail plan view of half of one end of the bolster with parts omitted and with a part of the side frame in section;
FIGURE 2 is a section along the line 2—2 of FIGURE 1;
FIGURE 3 is a section along the line 3—3 of FIGURE 1.

Like parts are indicated by like numerals throughout the specification and drawings.

Description of the preferred embodiments

A railroad car bolster 1 has a center plate 2 and projects at both ends into a truck side frame 3, windowed at 4. The bolster is supported by the load springs 5 in the window. Stabilizer springs 5, 6, resting on the side frame urge the stabilizer wedge 7 into engagement with the wear plate 8 on the frame in a wedge pocket 9 in the bolster similar to the arrangement shown in FIGURE 1 of Clasen United States Patent No. 3,127,850.

Since both ends of the bolster are spring supported, they are free to move up and down with respect to the side frames in the usual manner.

The torsion bar 11 extends across the truck parallel with the bolster and terminates in crank arms 12 which in turn terminate in crank pins 13. The crank pins are received in bearing lugs 14 which are welded on or may be cast integral with the side frame, the bearings being open inwardly toward the center of the car.

Horizontally slotted lugs 15 are welded, cast or otherwise attached to the outer face of the bolster adjacent the side frames and adjacent the cranks 11.

Under ordinary circumstances of railroad car use, the cranks 12 will be generally horizontal and the horizontal movement of the bolster across the window 4 will be limited by guide surfaces 16, 17 on bolster and car frame. The radius of the crank 12 is such that when the crank is in a horizontal position and the bolster has moved toward the right in FIGURE 3 to bring the surfaces 16 and 17 together, there will still be clearance between the torsion bar 11 and the bottom 18 of the slots 19 in the slotted lugs 15. Thus the bolster is free to move up and down rotating the torsion rod 11 and there is no danger of any disengagement of the torsion rod and the lug 15 as long as the bolster is spring supported in running condition.

When the load supporting springs are removed however, the bolster may be lowered in the window for disassembly of the truck in the usual manner. As that occurs, the crank 12 will in FIGURE 3 rotate in a counterclockwise direction until it rotates out of and disengages from the slot 15. The crank will then further rotate by gravity downwardly until it assumes the dotted line position shown at 20 and the bolster may be withdrawn without interference. For further disassembly, the side frames may be moved apart, thus disengaging the crank pins from the bearing bosses but until such separation of the side frames has taken place, the cranks, crank pins and torsion bar will remain in place, held by the two side frames and as long as the inner gibs 21 and outer gibs 22 on the bolster hold the two side frames against separation, the torsion rod and the balancing mechanism remains in place.

When this invention is to be applied to an old standard railroad car truck, the bearing bosses are welded or riveted in place on the side frame. The slotted lugs are welded or riveted in place on the bolster. Then the bolster and the side frame may be assembled in the usual manner. At the same time the crank pins on the torsion rod are inserted in the bearings, the torsion rod hanging down in the dotted line position 20 in FIGURE 3. Then as the bolster is raised upwardly, the cranks 12 will be rotated to engage the groove 19 until a position above that shown in FIGURE 3 is reached. Then the load supporting springs may be inserted and the bolster will be supported thereby with the torsion rod in the position shown in the drawing.

As the bolster is lowered for disassembly—the springs being removed—the torsion bars are gradually rotated out of the slots and the disengagement of the torsion bars and the bolster is complete while the bolster is still in the upper portion of the window, the upper portion of the window which contains the wear plate. This is important because upon reassembly as the bolster is moved upwardly the bolster is aligned in the upper portions of the windows before it is necessary to engage the torsion bar with the slots in the lugs 15.

I claim:
1. A railroad car truck has parallel windowed side frames, a spring-supported bolster extends through and is vertically movable in the window in each frame, a torsion bar parallel with the bolster has a crank at each end terminating in a crank pin rotatable in a bearing fixed in position in the side frame, the length of the torsion bar between the cranks being less than the distance between the inner faces of the truck side frames, lugs projecting from the bolster near each frame horizontally slotted to receive the bar, the depth of the slot being such that, as the bolster moves up and down in the windows during normal spring-supported operation, the bar slides horizontally toward and from the bolster and rotates in the slots, but when the springs are removed and the bolster is lowered toward the bottom of the windows, as the cranks rotate about their crank pins, the torsion bar is drawn horizontally away from the bolster far enough to escape from the grooves and hang freely under gravity entirely out of contact with the bolster.

References Cited

UNITED STATES PATENTS

| 2,166,769 | 7/1939 | Rabe | 105—224 XR |
| 2,403,045 | 7/1946 | Buckwalter | 105—197 |
| 2,751,857 | 6/1956 | Heater et al. | 105—197 |
| 3,127,850 | 4/1964 | Clasen | 105—197 |

ARTHUR L. LA POINT, Primary Examiner

HOWARD BELTRAN, Assistant Examiner

U.S. Cl. X.R.

267—3